United States Patent Office 3,770,723
Patented Nov. 6, 1973

3,770,723
PROCESS FOR PREPARING ISOMER OF 2-CHLORO-11 - (3 - DIMETHYLAMINOPROPYLIDENE) MORPHANTHRIDINE
Alexander E. Drukker, Milwaukee, Wis., assignor to Colgate-Palmolive Company, New York, N.Y.
No Drawing. Continuation-in-part of application Ser. No. 848,355, Aug. 7, 1969, now Patent No. 3,699,099, dated Oct. 17, 1972. This application Mar. 11, 1971, Ser. No. 123,374
Int. Cl. C07d 41/08
U.S. Cl. 260—239 D
1 Claim

ABSTRACT OF THE DISCLOSURE

The compound 2-chloro-11-(3-dimethylaminopropylidene)morphanthridine exists as two different geometric isomers. One of the isomers is useful as an antihypertensive. A method of preparation of the compound which results in maximum yields of the antihypertensive geometric isomer substantially free from the other geometric isomer is described.

RELATED CASE

This application is a continuation-in-part of my earlier application, Ser. No. 848,355 filed Aug. 7, 1969, now U.S. Pat. No. 3,699,099, granted Oct. 17, 1972.

DETAILED DESCRIPTION

The compound of the present invention has the following structural formula:

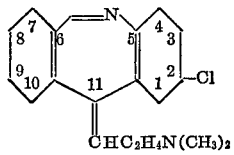

As previously mentioned, the compound can exist as two different geometric isomers.

A mixture of the two geometric isomers of 2-chloro-11 - (3 - dimethylaminopropylidene)morphanthridine has been found to lower blood pressure in animals, but not in a dose related fashion. It has now been discovered that only one of the geometric isomers decreases blood pressure and, surprisingly, in a dose related fashion. It has also been found that the other geometric isomer does not lower blood pressure but actually causes a blood pressure increase and, in addition, antagonizes the activity of the antihypertensive isomer.

It is an object of the present invention to isolate and identify the geometric isomer of 2-chloro-11-(3-dimethylaminopropylidene)morphanthridine which possesses antihypertensive activity.

It is a further object to disclose a method which results in the preparation of 2-chloro-11-(3-dimethylaminopropylidene)morphanthridine in the form of the desired geometric isomer and substantially free from the undesirable geometric isomer.

In my earlier parent application I disclosed a method of preparing 2-chloro-11-(3-dimethylaminopropylidene) morphanthridine which comprised reacting 2-chloro-11-morphanthridone and 3-dimethylaminopropylphosphorane. The product of that process was an approximately equal mixture of the two geometric isomers of 2-chloro-11-(3-dimethylaminopropylidene)morphanthridine.

The compound in the form of the isomer mixture was tested and found to lower blood pressure in anesthetized guinea pigs and anesthetized cats, but not in a dose related fashion. It has now been discovered that only one of the two geometric isomers is of value in lowering blood pressure, and I have found that I can obtain the desired geometric isomer substantially free of the undesired isomer by preparing 2-chloro-11-(3-dimethylaminopropylidene)-5,6 - dihydromorphanthridine, separating the resulting compound into its two geometric isomers and then oxidizing the crystalline isomer, M.P. about 150°, to give the geometric isomer of 2-chloro-11-(3-dimethylaminopropylidene)morphanthridine which is crystalline and melts at 90–94° C.

In the preferred practice of the method of the invention, 2-chloro-11-(3-dimethylaminopropylidene) - 5,6-dihydromorphanthridine is oxidized in an acid solution in the presence of at least 1% platinum oxide catalyst and air or oxygen to form the desired geometric isomer of 2-chloro - 11-(3 - dimethylaminopropylidene)morphanthridine.

It is important to have a method of detecting the different isomers because even this method of preparing the compound 2-chloro-11-(3 - dimethylaminopropylidene) morphanthridine results in a mixture of geometric isomers containing at least 90% of the desired geometric isomer and no more than 10% of the other geometric isomer. The geometric isomers of both the dihydro intermediate and the desired final compound can be detected and assayed using vapor phase chromatography, assuming that the general structure has been proven by elemental assay and infrared spectrum. For example, when 2-chloro-11-(3-dimethylaminopropylidene) - 5,6 - dihydromorphanthridin-6-one (I) is reduced to 2-chloro-11-(3-dimethylaminopropylidene) - 5,6 - dihydromorphanthridine (II) using lithium aluminum hydride, a viscous oil is obtained. Trituration of this oil with petroleum ether (B.P. 80–100°) causes the formation of a crystalline material, fraction α, while the mother liquor after evaporation left a viscous oily residue, fraction β.

Each of the fractions α and β is injected into a vapor phase chromatographic column of ⅛ inch diameter, length 6 feet, containing 10% UC-W98 on an inert support, oven temperature 250° C. Fraction α gives a major peak at 18½ minutes and a minor peak at 21 minutes, and fraction β gives a major peak at 21 minutes and a minor peak at 18½ minutes.

For purposes of identification, the first eluting isomer of 2 - chloro-11-(3-dimethylaminopropylidene)-5,6-dihydromorphanthridine is labeled "II A," and the second isomer is labeled "II B." Repeated recrystallizations of fraction α from acetonitrile give II A, while fraction β after chromatographic purification contains mainly II B with some II A. The purified II A when oxidized, preferably using 1% of platinum oxide as a catalyst, yields a compound which when chromatographed shows a single peak at 15 minutes. This peak coincides with one of the peaks which is observed when the isomeric mixture of the compound 2-chloro - 11 - (3-dimethylaminopropylidene) morphanthridine is chromatographed. When II B is oxidized, an oxidation product is obtained which shows a small peak at 15 minutes and a major peak at 17 minutes. These peaks coincide with both peaks obtained when the isomer mixture of 2-chloro-11-(3-dimethylaminopropylidene)morphanthridine is chromatographed. The geometric isomer which possesses the antihypertensive activity is the oxidation product of II A and it has a crystalline structure and melts at from 90° to 94° C. The other isomer has a lower melting point.

The oxidation of 2-chloro-11-(3-dimethylaminopropylidene)-5,6-dihydromorphanthridine is conducted in an acid solution of 1.6 N hydrochloric acid through which are or oxygen is passed and in the presence of a noble metal catalyst such as 1%–10% platinium oxide. The reaction mixture is heated until the oxidation is complete, then cooled, rendered alkaline, and extracted with benzene. The resulting oil is distilled in high vacuum to obtain a viscous oil that is recrystallized from petroleum ether to yield the light colored crystalline geometric isomer which melts at 90° to 94°.

The oxidation of the 5,6-dihydro intermediate may also be performed using a peroxide such as di-tertiary butylperoxide.

The 2-chloro-11-(3-dimethylaminopropylidene)-5,6-dihydromorphanthridine which is employed as an intermediate in the preparation of the compound of the invention may be prepared as described in the examples or in the manner described in United States Patent No. 3,381,000.

The geometric isomers of 2 - chloro-11-(3-dimethylaminopropylidene) morphanthridine may also be isolated from each other by crystallization procedures employing the base or one or more of its salts.

The geometric isomers of 2 - chloro-11-(3-dimethylaminopropylidene)morphanthridine were tested for antihypertensive activity in anesthetized animals. In one test the cats were divided into two groups and one group was given one of the geometric isomers and the other group the other isomer. The blood pressure was lowered in animals which received the crystalline isomer which had a melting point of 90° to 94°. However, the blood pressure of the animals that received the other geometric isomer rose. In another test, the blood pressure of animals that were administered a 50—50 mixture of the two isomers was decreased, but the decrease did not occur in a dose related fashion. In still another test, animals which were pre-treated with the non-crystalline geometric isomer and then treated with the antihypertensive crystalline geometric isomer were observed not to have the same decrease in blood pressure as when they were not pre-treated with the non-crystalline geometric isomer. This indicates that the presence of the other non-crystalline isomer interferes with and antagonizes the desirable activity of the crystalline isomer.

When employed as a pharmaceutical agent the isomer is preferably used in the form of acid addition salts. Such acid addition salts may be conveniently prepared by conventional means such as by contacting the compounds with a suitable acid in a mutual solvent and then removing the solvent to obtain the desired salt. Examples of acids which may be used are hydrochloric acid, succinic acid, tartaric acid, benzoic acid or fumaric acid.

Quaternary ammonium salts of the compounds may be formed by conventional techniques employing a suitable alkylating agent such as methyl chloride, methyl iodide or ethyl bromide.

Pharmaceutical dosage forms containing the active ingredients are generally prepared by combining the active ingredient or ingredients with a major amount of one or more suitable pharmaceutical diluents and then forming the resulting mixture into unit dosage forms suitable for oral or parenteral administration.

The unit dosage forms will generally contain from 5 to 250 mg. of the active ingredients. One or more of such units may be administered daily depending upon the patient's physical size and the severity of the condition being treated. However, generally the daily dosage will not exceed 150 mg. of the active ingredient per kilogram of the patient's body weight.

Representative of a suitable pharmaceutical composition which may be prepared is the following:

TABLETS

| | G. |
|---|---|
| 2-chloro - 11 - (3 - dimethylaminopropylidene)morphanthridine | 25 |
| Methyl cellulose, 400 cps. | 4 |
| Lactose | 9 |
| Magnesium stearate | 0.4 |
| Starch | 1.6 |

The powders, other than magnesium stearate, are granulated with water, passed through a No. 16 mesh screen and dried at 50° C. Magnesium stearate is mixed in and 40 mg. tablets are pressed.

The practice of the invention is further illustrated by the following examples:

EXAMPLE 1

2-chloro-11-(3-dimethylaminopropylidene)-5,6-dihydromorphanthridine

To a slurry of 75.8 g. of lithium aluminum hydride in 3.34 liters of tetrahydrofuran (THF) was added dropwise a solution of 152 g. of 2-chloro-11-(3-dimethylaminopropylidene)-5,6-dihydromorphanthridin - 6 - one in 1.34 liters of THF. The reaction mixture was stirred and refluxed for 15 hours, cooled, decomposed by dropwise addition of 40% potassium hydroxide solution, and filtered. The filtrate was concentrated in vacuum to afford 150 g. of a crystallizing yellow mass which was recrystallized by dissolving it in 900 ml. of boiling acetonitrile to afford 69.7 g. of crystalline material which was recrystallized three more times from approximately a 10-fold volume of acetonitrile to afford a crystalline product (isomer II A) of M.P. 154–156°.

EXAMPLE 2

2-chloro-11-(3-dimethylaminopropylidene) morphanthridine

Into a solution of 1 g. of 2-chloro-11-(3-dimethylaminopropylidene)-5,6-dihydromorphanthridine, isomer II A, in 100 ml. of 1.6 N hydrochloric acid was passed air or oxygen in the presence of 10 mg. of platinum oxide catalyst. The solution was heated for 15 hours, cooled, made alkaline with potassium hydroxide solution and the resulting oil was extracted into benzene, dried over potassium carbonate, filtered, and concentrated. The resulting oil was distilled in high vacuum using a "Kugelrohr" apparatus to yield 842 mg. of a viscous oil which was recrystallized from 8 ml. of petroleum ether, B.P. 60–70°, to afford 2-chloro - 11 - (3 - dimethylaminopropylidene) morphanthridine in the form of light colored crystals, M.P. 90–91°.

EXAMPLE 3

2-chloro-11-(3-dimethylaminopropylidene) morphanthridine

A solution of 500 mg. of 2-chloro - 11 - (3-dimethylaminopropylidene)-5,6-dihydromorphanthridine, isomer II A, and 350 mg. of di-tert butylperoxide in 10 ml. of chlorobenzene was heated 15 hours in a 140° oil bath. The solution was extracted with cold dilute hydrochloric acid, the aqueous layer was filtered, made alkaline with potassium hydroxide, and the resulting oil was extracted into benzene. The benzene layer was concentrated, the residue was distilled at high vacuum using a "Kugelrohr" apparatus to yield 247 mg. of a viscous oil which was recrystallized from petroleum ether, B.P. 60–70°, to afford 2-chloro - 11 - (3-dimethylaminopropylidene) morphanthridine in the form of light colored crystals, M.P. 90°.

What is claimed is:
1. The method of preparing the geometric isomer of 2-chloro-11-(3 - dimethylaminopropylidene)morphanthridine which melts at 90°–94° C., which method comprises isolating the geometric isomer of 2-chloro-11-(3-dimethylaminopropylidene)-5,6-dihydromorphanthridine which melts at about 150° C. and then oxidizing that isomer in the presence of at least 1% of a platinum oxide catalyst.

References Cited

UNITED STATES PATENTS 3,074,931  1/1963  Craig _____ 260—239 A

FOREIGN PATENTS 1,207,116  9/1970  Great Britain _____ 260—239 D

ALTON D. ROLLINS, Primary Examiner

U.S. Cl. X.R.

424—244